United States Patent [19]
Spurbeck et al.

[11] Patent Number: 5,717,619
[45] Date of Patent: Feb. 10, 1998

[54] COST REDUCED TIME VARYING FIR FILTER

[75] Inventors: Mark S. Spurbeck; Richard T. Behrens, both of Louisville, Colo.

[73] Assignee: Cirrus Logic, Inc., Fremont, Calif.

[21] Appl. No.: 545,968

[22] Filed: Oct. 20, 1995

[51] Int. Cl.⁶ .................................................. G06F 17/10
[52] U.S. Cl. .............................. 364/724.16; 364/724.011
[58] Field of Search ........................ 364/724.01, 724.16, 364/724.17, 724.011, 724.012, 724.013, 724.014

[56] References Cited

U.S. PATENT DOCUMENTS

| | | | |
|---|---|---|---|
| 4,866,647 | 9/1989 | Farrow | 364/724.1 |
| 5,127,051 | 6/1992 | Chan et al. | 380/49 |
| 5,177,734 | 1/1993 | Cummiskey et al. | 370/290 |
| 5,235,534 | 8/1993 | Potter | 364/724.01 |
| 5,258,933 | 11/1993 | Johnson et al. | 364/602 |
| 5,293,369 | 3/1994 | Melas et al. | 369/59 |
| 5,295,128 | 3/1994 | Hutchins et al. | 369/59 |
| 5,309,484 | 5/1994 | McLane et al. | 375/354 |
| 5,311,178 | 5/1994 | Pan et al. | 341/59 |
| 5,315,284 | 5/1994 | Bentley | 340/146.2 |
| 5,359,631 | 10/1994 | Behrens et al. | 375/376 |
| 5,369,606 | 11/1994 | Hessel | 364/724.16 |
| 5,384,552 | 1/1995 | Iwasaki | 331/25 |
| 5,410,362 | 4/1995 | Terada et al. | 348/614 |
| 5,440,532 | 8/1995 | Yokogawa et al. | 369/32 |
| 5,471,411 | 11/1995 | Adams et al. | 364/724.01 |
| 5,528,527 | 6/1996 | Iwata et al. | 364/724.13 |

OTHER PUBLICATIONS

Vetterli et al; Perfect Reconstruction FIR Filter Banks: Some Properties and Factorizations; IEEE Transactions on Signal Processing; pp. 1057–1071, Jul. 1989.

Ronald E. Crochiere and Lawrence R. Rabiner, *Multirate Digital Signal Processing*, 1983, Prentice–Hall, pp. 127–192.

Floyd M. Gardner, "Interpolation in Digital Modems—Part I: Fundamentals", *IEEE Transactions on Communications*, vol. 41, No. 3, Mar. 1993.

Floyd M. Gardner, "Interpolation in Digital Modems—Part II: Implementation and Performance", *IEEE Transactions on Communications*, vol. 41, No. 6, Jun. 1993.

C.M. Melas, P. Sutardja, "An Asynchronous Fully Digital Channel for Magnetic Recording", *IEEE Globecom '94*, vol. 2 of 3, pp. 1144–1147, 1994.

Chi–Tsong Chen, *Linear System Theory and Design*, Holt, Rinehart and Winston, 1984, pp. 569–570.

*Primary Examiner*—Reba I. Elmore
*Assistant Examiner*—Robert J. Dolan
*Attorney, Agent, or Firm*—Howard H. Sheerin; Dan A. Shifrin

[57] ABSTRACT

A method and apparatus for computing, in real time, the coefficients $C_r(n)$ of a time varying FIR filter according to an optimum singular value decomposition (SVD) algorithm. The coefficients of a plurality of FIR filters are represented by a M×N matrix $A_{M\times N}$, where M is the number of FIR filters and N is the number of coefficients in the impulse response of each FIR filter (i.e., the number of filter taps). The $A_{M\times N}$ matrix is factored into $F_{M\times N}$ and $G_{N\times N}$ matrices, and a singular value decomposition of the $A_{M\times N}$ matrix is computed as $A_{M\times N} = U_{M\times N} \cdot D_{N\times N} \cdot V_{N\times N}$, where $U_{M\times N}$ is a M×N unitary matrix, $D_{N\times N}$ is a N×N diagonal matrix $\{\sigma_1, \sigma_2, \ldots, \sigma_N\}$, $\sigma_i$ are the singular values of $A_{M\times N}$ (and $\sigma_1 \geq \sigma_2 \ldots \geq \sigma_N \geq 0$), and $V_{N\times N}$ is a N×N unitary matrix. By selecting a predetermined L number of the largest singular values $\sigma$ to generate a reduced size diagonal matrix $D_{L\times L}$, it is possible to extract the first L columns from the $U_{M\times N}$ matrix to form a reduced $U_{M\times L}$ matrix and to extract the first L rows from the $V_{N\times N}$ matrix to form a reduced $V_{L\times N}$ matrix. In this manner the filter matrix $A_{M\times N}$ can be approximated by reducing the $F_{M\times N}$ and $G_{N\times N}$ matrices by replacing N with L such that:

$$F_{M\times L} \cdot G_{L\times N} = U_{M\times L} \cdot D_{L\times L} \cdot V_{L\times N} \approx A_{M\times N}.$$

11 Claims, 8 Drawing Sheets

COST REDUCED TIME VARYING FIR FILTER

FIELD OF INVENTION

The present invention relates to time varying finite impulse response (FIR) filters for communication systems, particularly to a cost reduced implementation of a timing varying FIR filter.

BACKGROUND OF THE INVENTION

Time varying FIR filters, such as FIR interpolation filters, can be used in communication systems, such as telecommunications, digital recording devices, and the like, to implement sample rate conversions. In magnetic recording sampled amplitude read channels, for example, the timing recovery function might perform a sample rate conversion between asynchronous channel samples, generated by sampling an analog read signal from a magnetic read head, and synchronous samples corresponding to a particular partial response model. A time varying FIR interpolation filter carries out the sample rate conversion by interpolating the asynchronous channel samples to estimate the synchronous samples in response to a time varying interpolation interval $\tau$.

A prior art method for implementing a time varying FIR filter automatically re-programs the FIR filter with coefficients corresponding to a current input variable, such as an interpolation interval $\tau$. This approach, however, requires a significant amount of memory to store the potentially large number of filter coefficients, especially as the number of filter taps and interpolation intervals increase.

In particular, Cecil W. Farrow recognized the "unwieldy" task of storing such a large number of filter coefficients and, in U.S. Pat. No. 4,866,647 entitled, "Continuously Variable Digital Delay Circuit," Farrow discloses a cost reduced implementation of a time varying FIR interpolation filter that computes the filter coefficients in real time as a function of the interpolation interval $\tau$ rather than store all of the coefficients in memory. Farrow computes the coefficients according to a predetermined polynomial in $\tau$; that is, the coefficients $c_\tau(n)$ are computed according to the following equation, $$c_\tau(n) = \sum_{i=1}^{L} G_i(n) \cdot \tau^{i-1};$$

L is the order of the polynomial, and $G_i(n)$ are predetermined coefficients of the polynomial. The coefficients $G_i(n)$ of each polynomial in $\tau$ for computing a corresponding FIR interpolation filter coefficient $c_\tau(n)$ are chosen to minimize a mean squared error between an ideal coefficient and the actual coefficient generated by the above equation. However, computing the interpolation filter coefficients $c_\tau(n)$ in real time according to a polynomial in $\tau$ does not provide the optimum mean squared error solution to the problem.

There is, therefore, a need for a more optimum solution for computing, in real time, the coefficients $c_\tau(n)$ of a time varying FIR filter according to a function of an input variable, such as an interpolation interval $\tau$, so that it is not necessary to store all of the filter coefficients in memory.

SUMMARY OF THE INVENTION

The present invention computes, in real time, the coefficients $c_\tau(n)$ of a time varying FIR filter according to an optimum singular value decomposition (SVD) algorithm, comprising the steps of:

representing ideal FIR filter coefficients by a M×N matrix $A_{M \times N}$, where M is a number of discrete time FIR filters and N is a number of coefficients in the impulse response of each FIR filter (i.e., the number of filter taps);

factoring the $A_{M \times N}$ matrix into an $F_{M \times N}$ and $G_{N \times N}$ matrices;

performing a singular value decomposition of the $A_{M \times N}$ matrix such that $A_{M \times N} = U_{M \times N} \cdot D_{N \times N} \cdot V_{N \times N}$, where $U_{M \times N}$ is a M×N unitary matrix, D is a N×N diagonal matrix $\{\sigma_1, \sigma_2, \ldots, \sigma_N\}$ where $\sigma_i$ are the singular values of $A_{M \times N}$ (and $\sigma_1 \geq \sigma_2 \ldots \geq \sigma_N \geq 0$), and $V_{N \times N}$ is a N×N unitary matrix;

selecting a predetermined L number of the largest singular values $\sigma$ to generate a reduced size diagonal matrix $D_{L \times L}$;

extracting the first L columns from the $U_{M \times N}$ matrix to form a reduced $U_{M \times L}$ matrix;

extracting the first L rows from the $V_{N \times N}$ matrix to form a reduced $V_{L \times N}$ matrix;

defining a reduced $F_{M \times L}$ and $G_{L \times N}$ matrices such that:

$$F_{M \times L} \cdot G_{L \times N} = U_{M \times L} \cdot D_{L \times L} \cdot V_{L \times N} = A_{M \times N}$$

(for example, let $F_{M \times L} = U_{M \times L} \cdot D_{L \times L}$ and $G_{L \times N} = V_{L \times N}$).

The product of the $F_{M \times L}$ and $G_{L \times N}$ matrices is a reduced rank approximation of the $A_{M \times N}$ matrix. The convolution process of the time varying FIR filter can then be carried out by implementing the $G_{L \times N}$ matrix as a bank of FIR filters and the $F_{M \times L}$ matrix as a lookup table indexed by an input variable such as an interpolation interval $\tau$. Since the $F_{M \times L}$ and $G_{L \times N}$ matrices have been reduced in size, the time varying FIR filter of the present invention is significantly more cost effective than prior art implementations that store all of the ideal coefficients of the $A_{M \times N}$ matrix in memory. Furthermore, the SVD solution to finding the minimum mean squared error between the ideal coefficients and actual coeficients is more optimum than the polynomial approach disclosed by Farrow.

In order to provide a complete operational understanding of the time varying FIR filter, the following brief and detailed description disclose the present invention as a time varying FIR interpolation filter used in the timing recovery function of a sampled amplitude read channel for magnetic recording. However, the present invention is equally applicable to various other digital communication systems, and the application to sampled amplitude read channels is illustrative only; the scope of the claims is not limited to any particular application.

BRIEF DESCRIPTION OF THE DRAWINGS

The above and other aspects and advantages of the present invention will be better understood by reading the following detailed description of the invention in conjunction with the drawings, wherein:

FIG. 4A is a detailed block diagram of the prior art sampling timing recovery comprising a sampling VFO.

DETAILED DESCRIPTION OF THE PREFERRED EMBODIMENT

Conventional Sampled Amplitude Read Channel

Figure 1:
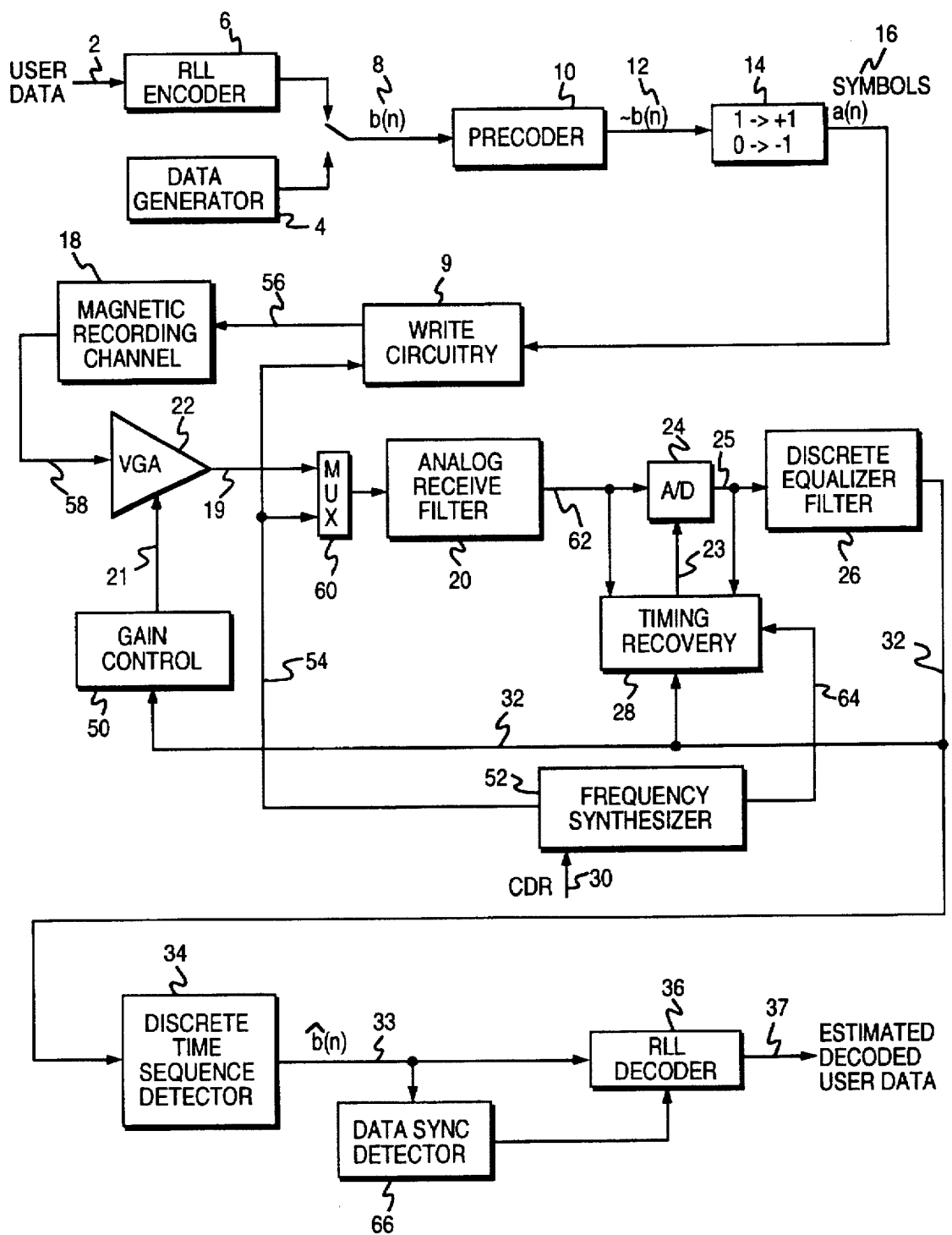
FIG. 1 is a block diagram of a conventional sampled amplitude recording channel.

Referring now to FIG. 1, shown is a detailed block diagram of a conventional sampled amplitude read channel. During a write operation, either user data 2 or preamble data from a data generator 4 (for example 2T preamble data) is written onto the media. A run-length limited (RLL) encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=-1 and ~b(N)=1 into a(N)=+1. Write circuitry 9, responsive to the symbols a(n) 16, modulates the current in the recording head coil at the baud rate 1/T to record the binary sequence onto the media. A frequency synthesizer 52 provides a baud rate write clock 54 to the write circuitry 9.

When reading the recorded binary sequence from the media, timing recovery 28 first locks to the write frequency by selecting, as the input to the read channel, the write clock 54 through a multiplexor 60. Once locked to the write frequency, the multiplexor 60 selects the signal 19 from the read head as the input to the read channel in order to acquire an acquisition preamble. A variable gain amplifier 22 adjusts the amplitude of the analog read signal 58, and an analog filter 20 provides initial equalization toward the desired response. A sampling device 24 samples the analog read signal 62 from the analog filter 20, and a discrete time filter 26 provides further equalization of the sample values 25 toward the desired response. In partial response recording, for example, the desired response is often selected from Table 1.

The equalized sample values 32 are applied to decision directed gain control 50 and timing recovery 28 for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the timing recovery frequency over temperature, voltage, and process variations. A Channel Data Rate (CDR) control signal 30 adjusts a frequency range of the synthesizer 52 according to the data rate for the current zone. Gain control 50 adjusts the gain of variable gain amplifier 22 over line 21. The equalized samples Y(n) 32 are sent to a discrete time sequence detector 34, such as a maximum likelihood (ML) Viterbi sequence detector, to detect an estimated binary sequence ^b(n) 33. An RLL decoder 36 decodes the estimated binary sequence ^b(n) 33 into estimated user data 37. A data sync detector 66 detects the sync mark 70 (shown in FIG. 2B) in the data sector 15 in order to frame the operation of the RLL decoder 36. In the absence of errors, the estimated binary sequence ^b(n) 33 is equal to the recorded binary sequence b(n) 8, and the decoded user data 37 is equal to the recorded user data 2.

Data Format

Figure 2A:
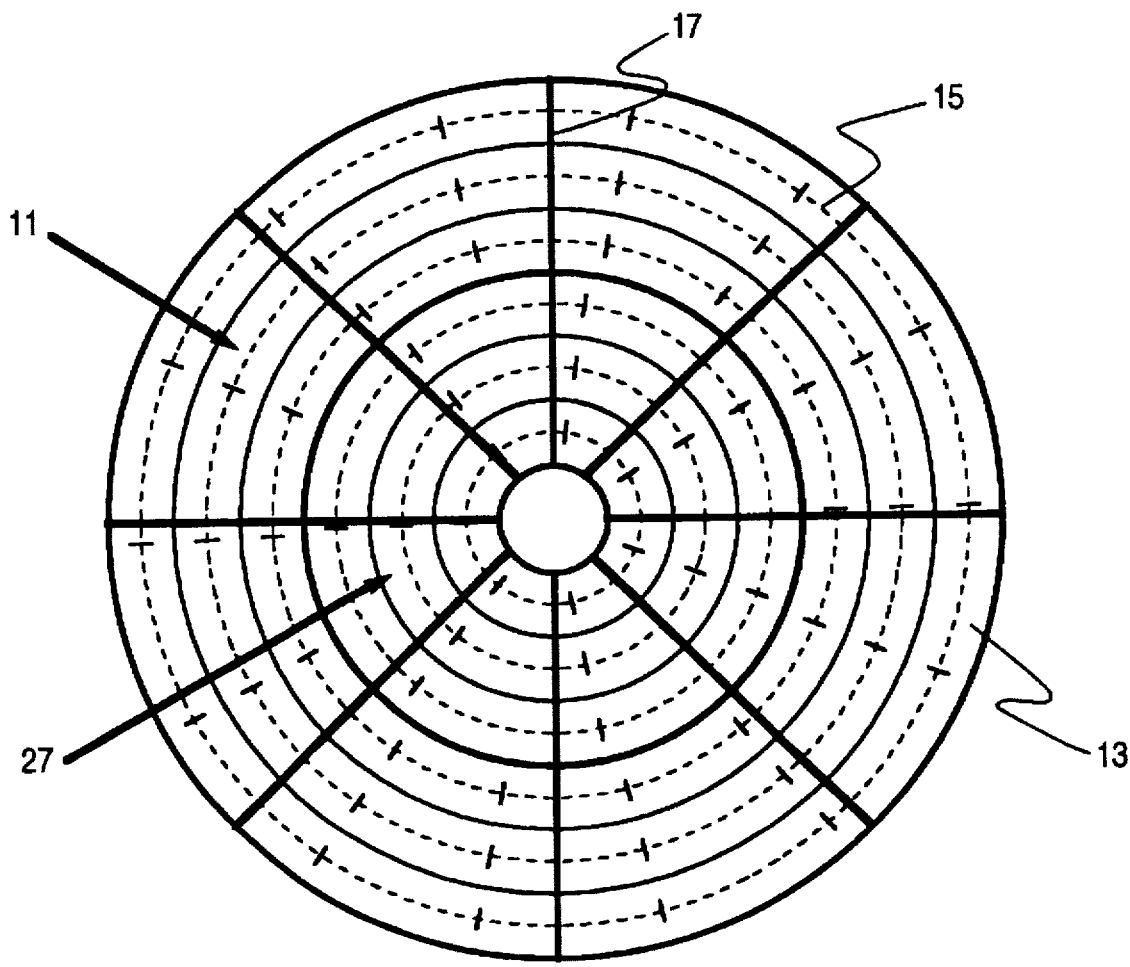
FIG. 2A shows an exemplary data format of a magnetic disk having a plurality of concentric tracks comprised of a plurality of user data sectors and embedded servo data sectors.
Figure 2B:
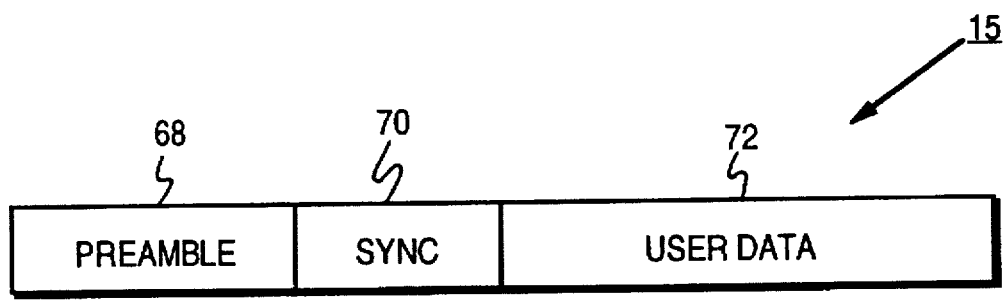
FIG. 2B shows an exemplary format of a user data sector.

FIG. 2A shows an exemplary data format of a magnetic media comprising a series of concentric data tracks 13 wherein each data track 13 is comprised of a plurality of sectors 15, and wherein a plurality of servo fields 17 are embedded in the sectors. The servo fields 17 are processed to verify the track and sector position of the read/write head. Additionally, servo bursts within the servo field 17 are processed to keep the head aligned over a centerline of the desired track 13 while writing and reading data. FIG. 2B shows the format of a sector 15 comprising an acquisition preamble 68, a sync mark 70, and user data 72. Timing recovery uses the acquisition preamble 68 to acquire the correct sampling frequency and phase before reading the user data 72, and the sync mark 70 demarks the beginning of the user data 72 (see co-pending U.S. patent application Ser. No. 08/313,491 entitled "Improved Timing Recovery For Synchronous Partial Response Recording").

Improved Sampled Amplitude Read Channel

Figure 3:
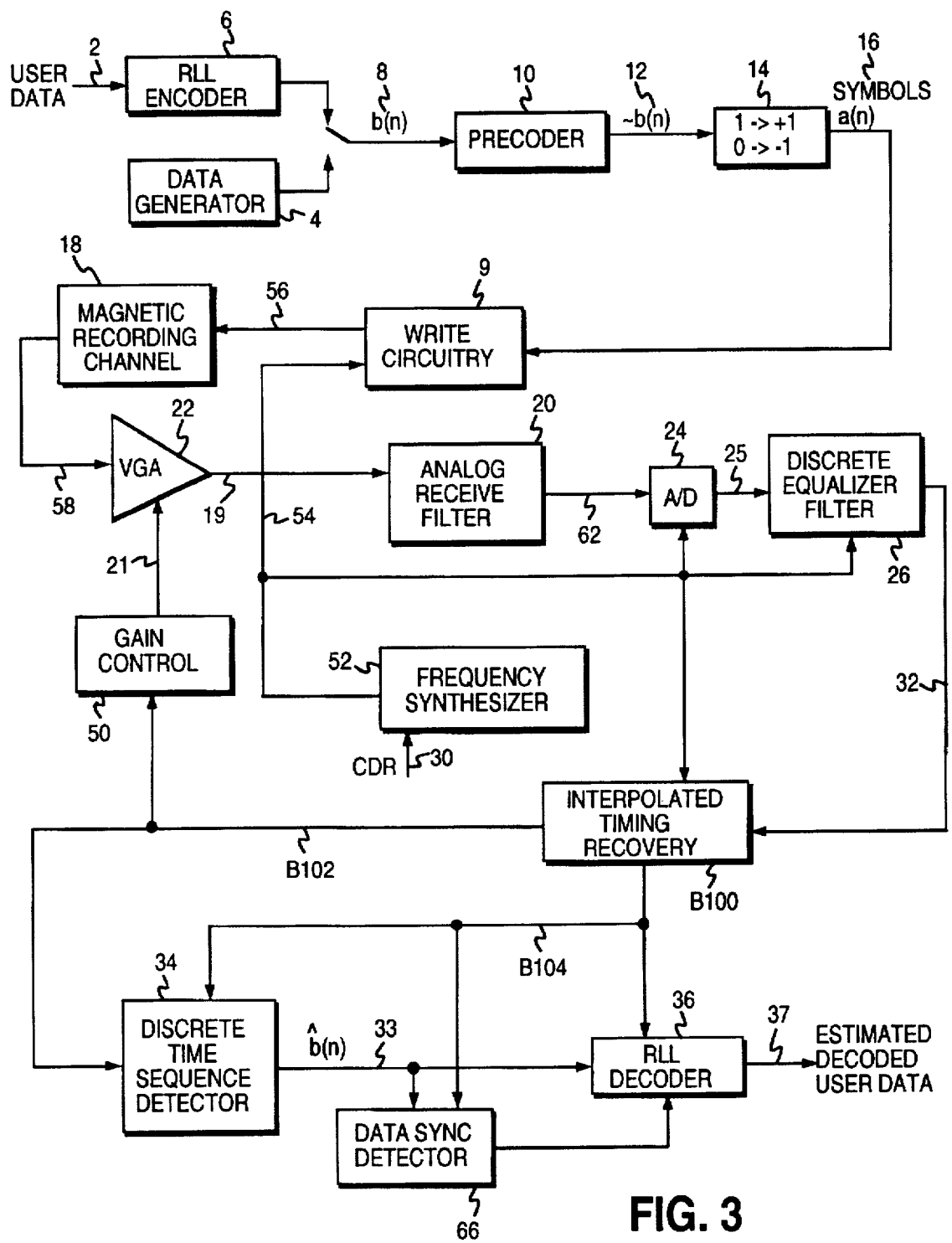
FIG. 4A FIG. 3 is a block diagram of the improved sampled amplitude read channel of the present invention comprising interpolating timing recovery.

FIG. 3 shows the improved sampled amplitude read channel of the present invention wherein the conventional sampling timing recovery 28 of FIG. 1 has been replaced by interpolated timing recovery B100. In addition to supplying a baud rate write clock over line 54 to the write circuitry 9, the frequency synthesizer 52 generates a sampling clock applied over line 54 to the sampling device 24. When reading data, the frequency synthesizer 52 is adjusted to output the sampling clock at a slightly higher frequency than the write clock (e.g., 1% to 2%) so that the analog read signal is sampled faster than the baud rate. The sampling clock is also applied to the discrete time equalizer filter 26 and the interpolated timing recovery B100. The interpolated timing recovery B100 interpolates the equalized sample values 32 to generate interpolated sample values B102 synchronized to the baud rate. The discrete time sequence detector 34 detects the estimated binary sequence 33 from the interpolated sample values B102. Interpolated timing recovery B100 also generates a data clock B104 for clocking operation of the discrete time sequence detector 34, sync mark detector 66 and RLL decoder 36.

Timing Recovery

Figure 4A:
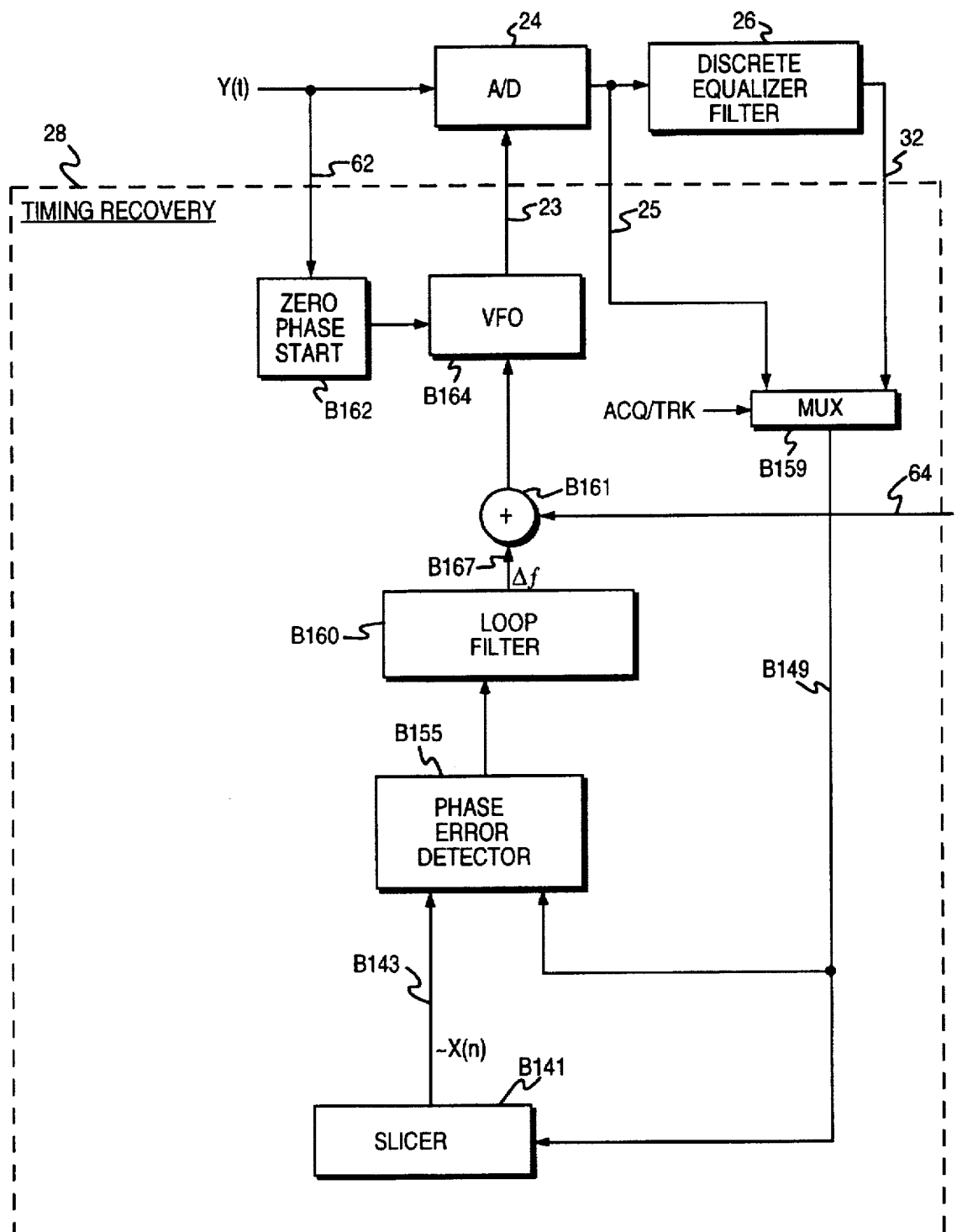

An overview of the conventional sampling timing recovery 28 of FIG. 1 is shown in FIG. 4A. The output 23 of a variable frequency oscillator (VFO) B164 controls the sampling clock of a sampling device 24 which is typically an analog-to-digital converter (A/D) in digital read channels. A multiplexor B159 selects the unequalized sample values 25 during acquisition, and the equalized sample values 32 during tracking. The discrete equalizer filter 26 is removed from the timing loop during acquisition to avoid its associated latency. A phase error detector B155 generates a phase error in response to the sample values received over line B149 and estimated sample values ~X(n) from a sample value estimator B141, such as a slicer in a d=0 PR4 read channel, over line B143. A loop filter B160 filters the phase error to generate a frequency offset Δf B167 that settles to a value proportional to a frequency difference between the sampling clock 23 and the baud rate. The frequency offset Δf B167, together with the center frequency control signal 64 from the frequency synthesizer 52, adjust the sampling clock 23 at the output of the VFO B164 in order to synchronize the sampling to the baud rate. A zero phase start B162 circuit suspends operation of the VFO 164 at the beginning of acquisition in order to minimize the initial phase error between the sampling clock 23 and the read signal 62. This is achieved by disabling the VFO B164, detecting a zero crossing in the analog read signal 62, and re-enabling the VFO B164 after a predetermined delay between the detected zero crossing and the first baud rate sample.

Figure 4B:
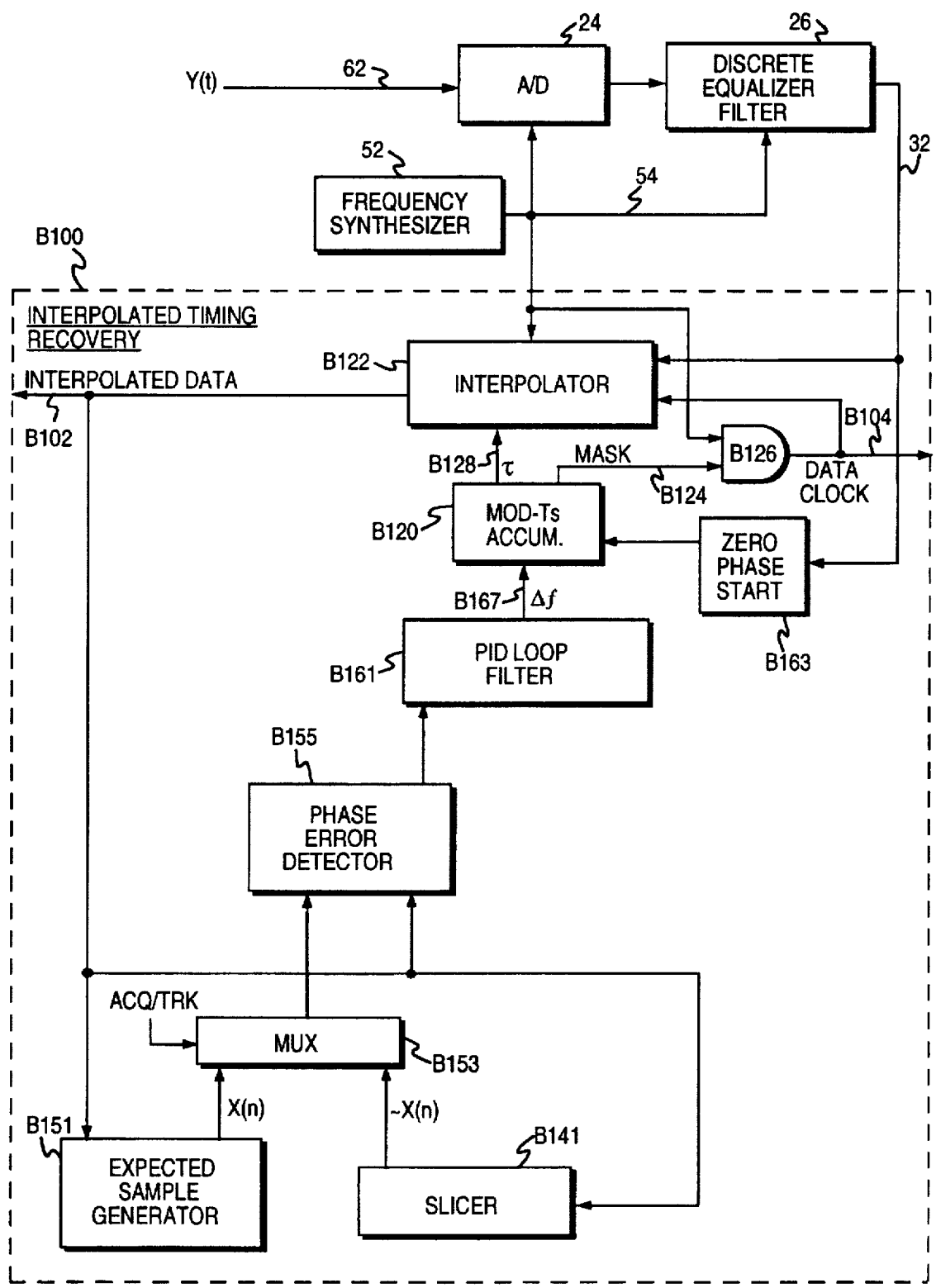
FIG. 4B is a detailed block diagram of the interpolating timing recovery of the present invention comprising an interpolator.

The interpolated timing recovery B100 of the present invention is shown in FIG. 4B. The VFO B164 of FIG. 4A is replaced with a modulo-Ts accumulator B120 and an interpolator B122. In addition, an expected sample value generator B151, responsive to interpolated sample values B102, generates expected samples X(n) used by the phase error detector B155 to compute the phase error during acquisition. A multiplexor B153 selects the estimated sample values ~X(n) from the slicer for use by the phase error detector B155 during tracking. The data clock B104 is generated at the output of an AND gate B126 in response to the sampling clock 54 and a mask signal B124 from the modulo-Ts accumulator B120 as discussed in further detail below. The phase error detector B155 and the slicer B141 process interpolated sample values B102 at the output of the interpolator B122 rather than the channel sample values 32 at the output of the discrete equalizer filter 26 as in FIG. 4A. A PID loop filter B161 controls the closed loop frequency response similar to the loop filter B160 of FIG. 4A.

In the interpolated timing recovery of the present invention, locking a VFO to a reference frequency before acquiring the preamble is no longer necessary; multiplexing 60 the write clock 54 into the analog receive filter 20 is not necessary. Further, the sampling device 24 and the discrete equalizer filter 26 together with their associated delays have been removed from the timing loop; it is not necessary to multiplex B159 around the equalizer filter 26 between acquisition and tracking. However, it is still necessary to acquire a preamble 68 before tracking the user data 72. A zero phase start circuit B163 minimizes the initial phase error between the interpolated sample values and the baud rate at the beginning of acquisition similar to the zero phase start circuit B162 of FIG. 4A. However, rather than suspend operation of a sampling VFO B164, the zero phase start circuit B163 for interpolated timing recovery computes an initial phase error τ from the equalized sample values 32 and loads the initial phase error into the modulo-Ts accumulator B120.

For a more detailed description of the PID loop filter B161, phase error detector B155, expected sample generator B151, and slicer B141, refer to the above referenced co-pending U.S. patent applications "Sampled Amplitude Read Channel Comprising Sample Estimation Equalization, Defect Scanning, Channel Quality, Digital Servo Demodulation, PID Filter for Timing Recovery, and DC Offset Control" and "Improved Timing Recovery For Synchronous Partial Response Recording." A detailed description of the modulo-Ts accumulator B120, data clock B104, and interpolator B122 is provided below.

Interpolator

Figure 5:
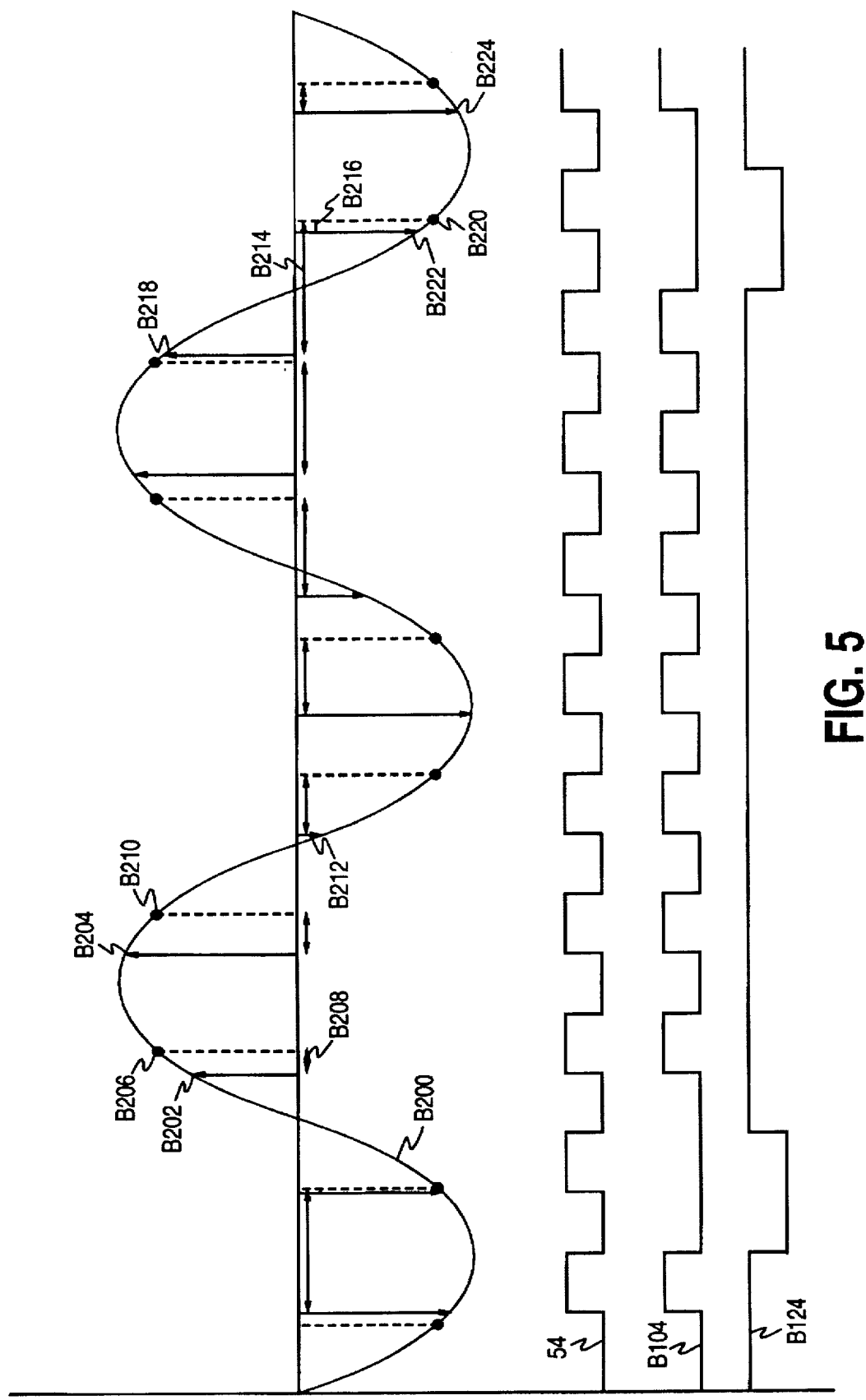
FIG. 5 illustrates the channels samples in relation to the interpolated baud rate samples for the acquisition preamble.

The interpolator B122 of FIG. 4B is understood with reference to FIG. 5 which shows a sampled 2T acquisition preamble signal B200. The target sample values are shown as black circles and the channel sample values as arrows. Below the sampled preamble signal is a timing diagram depicting the corresponding timing signals for the sampling clock 54, the data clock B104 and the mask signal B124. As can be seen in FIG. 5, the preamble signal B200 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N)=x(N)+\tau \cdot (x(N-1)-x(N)); \text{ where:} \quad (1)$$

x(N) and x(N−1) are the channel samples surrounding the target sample; and τ is an interpolation interval proportional to a time difference between the channel sample value x(N−1) and the target sample value. The interpolation interval τ is generated at the output of modulo-Ts accumulator B120 which accumulates the frequency offset signal Δf B167 at the output of the PID loop filter B161:

$$\tau = (\Sigma \Delta f) \text{ MOD TS; where:} \quad (2)$$

Ts is the sampling period of the sampling clock 54. Since the sampling clock 54 samples the analog read signal 62 slightly faster than the baud rate, it is necessary to mask the data clock every time the accumulated frequency offset Δf, integer divided by Ts, increments by 1. Operation of the data clock B104 and the mask signal B124 generated by the modulo-Ts accumulator B120 is understood with reference to the timing diagram of FIG. 5.

Assuming the interpolator implements the simple linear equation (1) above, then channel sample values B202 and B204 are used to generate the interpolated sample value corresponding to target sample value B206. The interpolation interval τ B208 is generated according to equation (2) above. The next interpolated sample value corresponding to the next target value B210 is computed from channel sample values B204 and B212. This process continues until the interpolation interval τ B214 would be greater than Ts except that it "wraps" around and is actually τ B216 (i.e., the accumulated frequency offset Δf, integer divided by Ts, increments by 1 causing the mask signal B124 to activate). At this point, the data clock B104 is masked by mask signal B124 so that the interpolated sample value corresponding to the target sample value B220 is computed from channel sample values B222 and B224 rather than channel sample values B218 and B222.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator B122 is implemented as a filter responsive to more than two channel samples to compute the interpolated sample value.

The ideal discrete time phase interpolation filter has a flat magnitude response and a constant group delay of τ:

$$C_\tau(e^{j\omega})=e^{j\omega\tau} \quad (3)$$

which has an ideal impulse response:

$$\text{sinc}(\pi \cdot (n-\tau/Ts)). \quad (4)$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega})-C_\tau(e^{j\omega})X(e^{j\omega}); \text{ where:} \quad (5)$$

$\overline{C}_\tau(e^{j\omega})$ is the spectrum of the actual interpolation filter; and $X(e^{j\omega})$ is the spectrum of the input signal. From equation (5), the mean squared error is represented by:

$$E_\tau^2 = \frac{1}{2\pi} \int_{-\pi}^{\pi} |\overline{C}_\tau(e^{j\omega}) - e^{j\omega\tau}|^2 |X(e^{j\omega})|^2 d\omega; \text{ where:} \quad (6)$$

$X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is band limited to some predetermined constant $0 \leq \omega \leq \alpha\pi$ where $0 < \alpha < 1$; that is:

$|X(e^{j\omega})|=0, \text{ for } |\omega| \geq \alpha\pi.$

Then equation (6) can be expressed as:

$$E_{\tau,\alpha}^2 = \frac{1}{2\pi} \int_{-\alpha\pi}^{\alpha\pi} |\overline{C}_\tau(e^{j\omega}) - e^{j\omega\tau}|^2 |X(e^{j\omega})|^2 d\omega. \quad (7)$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\overline{C}_\tau(e^{j\omega}) = \sum_{n=-R}^{n=R-1} C_\tau(n) e^{-j\omega n}; \text{ where:} \quad (8)$$

2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi} \int_{-\alpha\pi}^{\alpha\pi} \left| \sum_{n=-R}^{n=R-1} C_\tau(n) e^{-j\omega n} - e^{j\omega\tau} \right|^2 |X(e^{j\omega})|^2 d\omega. \quad (9)$$

The next step is to take the derivatives of equation (9) with respect to the coefficients $c_\tau(n)$ and set them to zero:

$$\frac{\partial E_{\tau,\alpha}^2}{\partial C_\tau(n_o)} = 0 \text{ for } n_o = -R, \ldots, 0, 1, \ldots, R-1. \quad (10)$$

After careful manipulation, equation (10) leads to:

$$\int_{-\alpha\pi}^{\alpha\pi} \left[ \left( \sum_{n=-R}^{n=R-1} C_\tau(n) \cos(\omega(n_o - n)) \right) - \cos(\omega(n_o + \tau)) \right] |X(e^{j\omega})|^2 d\omega = 0 \quad (11)$$

for $n_o = -R, \ldots, 0, 1, \ldots, R-1.$

Defining $\phi(r)$ as:

$$\phi(r) = \int_{-\alpha\pi}^{\alpha\pi} |X(e^{j\omega})|^2 \cos(\omega r) d\omega \quad (12)$$

and substituting equation (12) into equation (11) gives:

$$\sum_{n=-R}^{n=R-1} C_\tau(n) \phi(n - n_o) = \phi(n_o + \tau) \quad (13)$$

for $n_o = -R, \ldots, 0, 1, \ldots, R-1.$

Equation (13) defines a set of 2R linear equations in terms of the coefficients $c_\tau(n)$. Equation (13) can be expressed more compactly in matrix form:

$\Phi_T C_\tau = \Phi_\tau;$ where:

$C_\tau$ is a column vector of the form:

$C_\tau = [c_\tau(-R), \ldots, c_\tau(0), \ldots, c_\tau(R-1)]^t$ $\Phi_T$ is a Toeplitz matrix of the form:

$$\Phi_T = \begin{bmatrix} \phi(0) & \phi(1) & \ldots & \phi(2R-1) \\ \phi(1) & \phi(0) & & \\ \vdots & & & \vdots \\ \phi(2R-1) & & \ldots & \phi(0) \end{bmatrix}$$

and $\Phi_\tau$ is a column vector of the form:

$\Phi_\tau = [\phi(-R+\tau), \ldots, \phi(\tau), \phi(1+\tau), \ldots, \phi(R-1+\tau)]^t.$ (14)

The solution to equation (14) is:

$C_\tau = \Phi_T^{-1} \Phi_\tau;$ where: (15)

$\Phi_T^{-1}$ is an inverse matrix that can be solved using well known methods.

Figure 6:
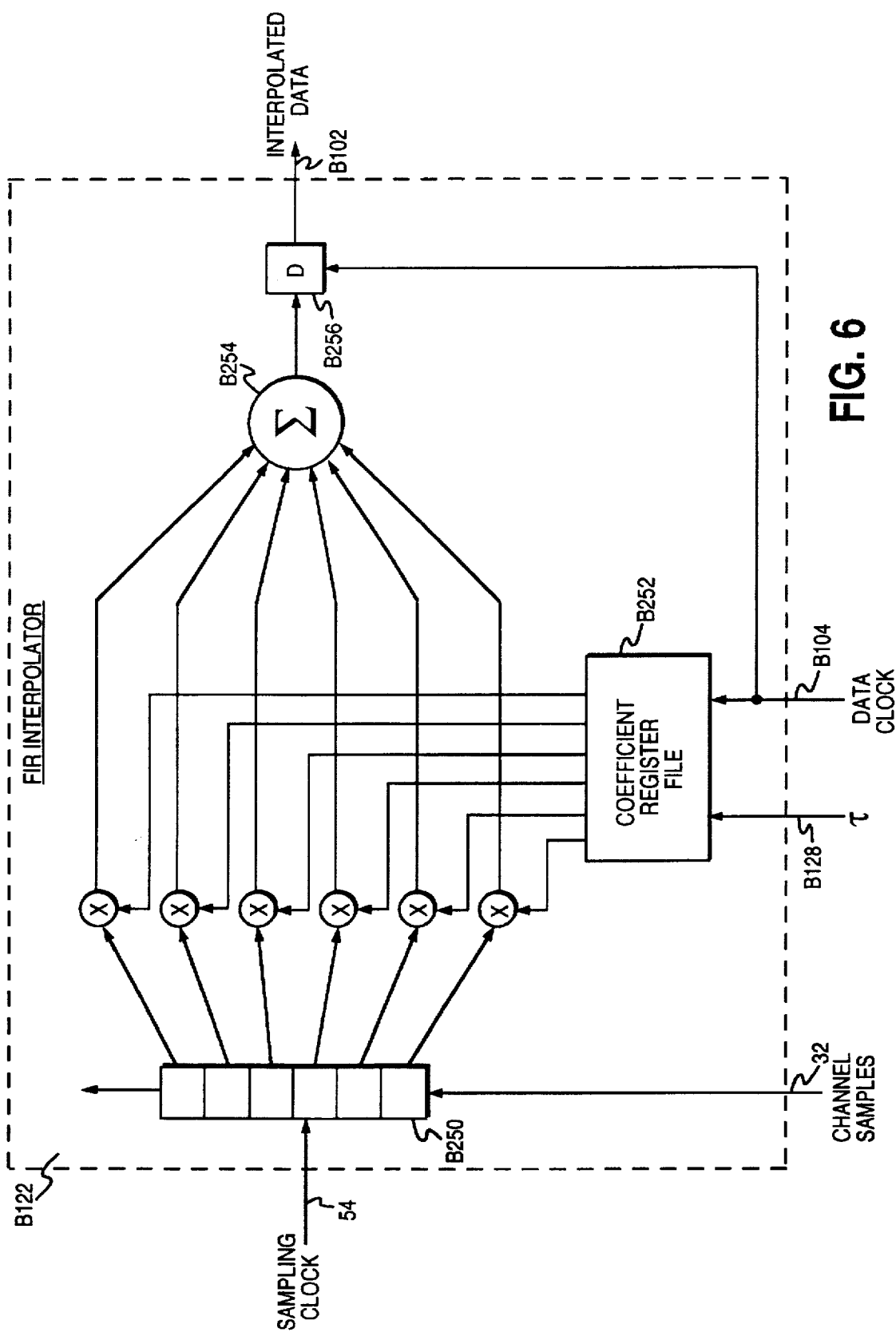
FIG. 6 shows an FIR filter implementation for the timing recovery interpolator.

Table B2 shows example coefficients $c_\tau(n)$ calculated from equation (15) with 2R=6, $\alpha$=0.8 and $X(e^{j\omega})$=PR4. The implementation of the six tap FIR filter is shown in FIG. 6. A shift register B250 receives the channel samples 32 at the sampling clock rate 54. The filter coefficients $c_\tau(n)$ are stored in a coefficient register file B252 and applied to corresponding multipliers according to the current value of $\tau$ B128. The coefficients are multiplied by the channel samples 32 stored in the shift register B250. The resulting products are summed B254 and the sum stored in a delay register B256. The coefficient register file B252 and the delay register B256 are clocked by the data clock B104 to implement the masking function described above.

In an alternative embodiment not shown, a plurality of static FIR filters, having coefficients that correspond to the different values of $\tau$, filter the sample values in the shift register B250. Each filter outputs an interpolation value, and the current value of the interpolation interval $\tau$ B128 selects the output of the corresponding filter as the output B102 of the interpolator B122. Since the coefficients of one filter are not constantly updated as in FIG. 6, this multiple filter embodiment increases the speed of the interpolator B122 and the overall throughput of the read channel.

Cost Reduced Interpolator

Rather than store all of the coefficients of the interpolation filters in memory, in a more efficient, cost reduced implementation the coefficient register file B252 of FIG. 6 computes the filter coefficients $c_\tau(n)$ in real time as a function of $\tau$. For example, the filter coefficients $c_\tau(n)$ can be computed in real time according to a predetermined polynomial in $\tau$ (see, for example, U.S. Pat. No. 4,866,647 issued to Farrow entitled, "A Continuously Variable Digital Delay Circuit," the disclosure of which is hereby incorporated by reference). An alternative, preferred embodiment for computing the filter coefficients in real time estimates the filter coefficients according to a reduced rank matrix representation of the coefficients.

The bank of filter coefficients stored in the coefficient register file B252 can be represented as an M×N matrix $A_{M\times N}$, where N is the depth of the interpolation filter (i.e., the number of coefficients $c_\tau(n)$ in the impulse response computed according to equation (15)) and M is the number of interpolation intervals (i.e., the number of $\tau$ intervals). Rather than store the entire $A_{M\times N}$ matrix in memory, a more efficient, cost reduced implementation is attained through factorization and singular value decomposition (SVD) of the $A_{M\times N}$ matrix.

Consider that the $A_{M\times N}$ matrix can be factored into an $F_{M\times N}$ and $G_{N\times N}$ matrix.

$$A_{M\times N} = F_{M\times N} \cdot G_{N\times N}.$$

Then a reduced rank approximation of the $A_{M\times N}$ matrix can be formed by reducing the size of the $F_{M\times N}$ and $G_{N\times N}$ matrices by replacing N with L where L<N and, preferably, L<<N. Stated differently, find the $F_{M\times L}$ and $G_{L\times N}$ matrices whose product best approximates the $A_{M\times N}$ matrix.

$$A_{M\times N} = F_{M\times L} \cdot G_{L\times N}.$$

Figure 7:
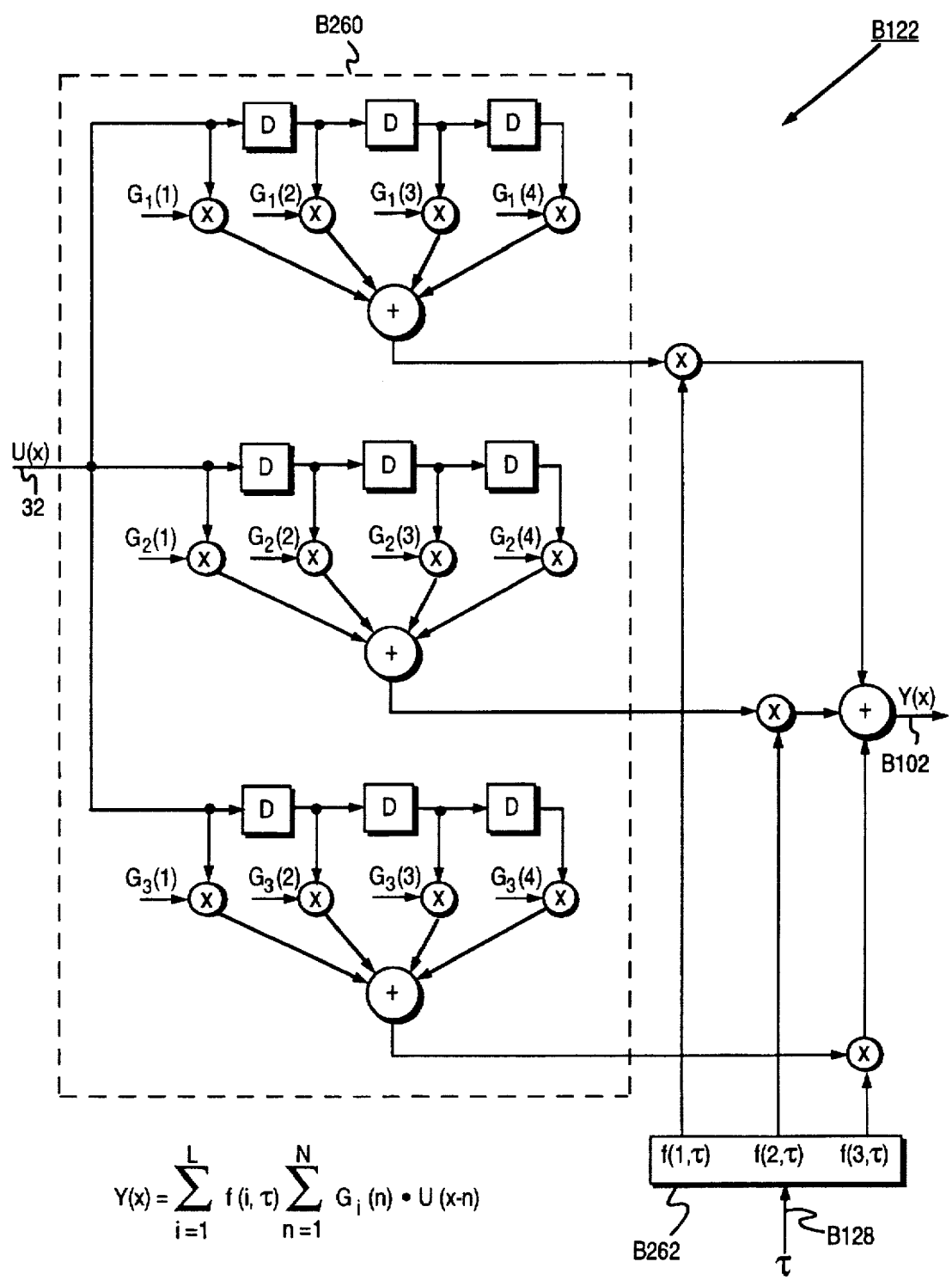
FIG. 7 depicts a cost reduced implementation for the timing recovery interpolator.

The convolution process of the interpolation filter can then be carried out, as shown in FIG. 7, by implementing the $G_{L\times N}$ matrix as a bank of FIR filters B260 connected to receive the channel sample values 32, and the $F_{M\times L}$ matrix implemented as a lookup table B262 indexed by $\tau$ B128 (as will become more apparent in the following discussion). Those skilled in the art will recognize that, in an alternative embodiment, the $A_{M\times N}$ matrix can be factored into more than two matrices (i.e., A=FGH...).

The preferred method for finding the $F_{M\times L}$ and $G_{L\times N}$ matrices is to minimize the following sum of squared errors:

$$\sum_{j=1}^{M} \sum_{n=1}^{N} (A_{jn} - (F_{M\times L} \cdot G_{L\times N})_{jn})^2 \qquad (16)$$

The solution to equation (16) can be derived through a singular value decomposition of the $A_{M\times N}$ matrix, comprising the steps of:

1. performing an SVD on the $A_{M\times N}$ matrix which gives the following unique factorization (assuming $M \geq N$):

$$A_{M\times N} = U_{M\times N} \cdot D_{N\times N} \cdot V_{N\times N} \text{ where:}$$

$U_{M\times N}$ is a M×N unitary matrix;

$D_{N\times N}$ is a N×N diagonal matrix $\{\sigma_1, \sigma_2, \ldots, \sigma_N\}$ where $\sigma_i$ are the singular values of $A_{M\times N}$, and $\sigma_1 \geq \sigma_2 \ldots \geq \sigma_N \geq 0$; and $V_{N\times N}$ is a N×N unitary matrix;

2. selecting a predetermined L number of the largest singular values $\sigma$ to generate a reduced size diagonal matrix $D_{L\times L}$:

$$D_{L\times L} = \text{Diag}\{\sigma_1, \sigma_2, \ldots, \sigma_L\} = \begin{bmatrix} \sigma_1 & 0 & \ldots & 0 \\ 0 & \sigma_2 & 0 \ldots & \vdots \\ \vdots & \ldots & \ddots & 0 \\ 0 & \ldots & 0 & \sigma_L \end{bmatrix}$$

3. extracting the first L columns from the $U_{M\times N}$ matrix to form a reduced $U_{M\times L}$ matrix:

$$U_{M\times L} = \begin{bmatrix} U_{1,1} & \ldots & U_{1,L} \\ \vdots & \ldots & \ldots \\ \vdots & \ldots & \ldots \\ U_{M,1} & \ldots & U_{M,L} \end{bmatrix} \begin{matrix} \ldots & U_{1,N} \\ \ldots & \vdots \\ \ldots & \vdots \\ \ldots & U_{M,N} \end{matrix}$$

4. extracting the first L rows from the $V_{N\times N}$ matrix to form a reduced $V_{L\times N}$ matrix:

$$V_{L\times N} = \begin{bmatrix} V_{1,1} & \ldots & V_{1,N} \\ \vdots & \ldots & \vdots \\ V_{L,1} & \ldots & V_{L,N} \\ \vdots & \ldots & \vdots \\ V_{N,1} & \ldots & V_{N,N} \end{bmatrix}$$

5. defining the $F_{M\times L}$ and $G_{L\times N}$ matrices such that:

$$F_{M\times L} \cdot G_{L\times N} = U_{M\times L} \cdot D_{L\times L} \cdot V_{L\times N} \approx A_{M\times N}$$

(for example, let $F_{M\times L} = U_{M\times L} \cdot D_{L\times L}$ and $G_{L\times N} = V_{L\times N}$).

In the above cost reduced polynomial and reduced rank matrix embodiments, the interpolation filter coefficients $c_\tau(n)$ are computed in real time as a function of $\tau$; that is, the filter's impulse response h(n) is approximated according to:

$$h(n,\tau) = c_\tau(n) = \sum_{i=1}^{L} G_i(n) \cdot f(i,\tau); \text{ where:} \qquad (17)$$

$f(i,\tau)$ is a predetermined function in $\tau$ (e.g., polynomial in $\tau$ or $\tau$ indexes the above $F_{M\times L}$ matrix); L is a degree which determines the accuracy of the approximation (e.g., the order of the polynomial or the column size of the above $F_{M\times L}$ matrix); and $G_i(n)$ is a predetermined matrix (e.g., the coefficients of the polynomial or the above $G_{L\times N}$ matrix). As L increases, the approximated filter coefficients $c_\tau(n)$ of equation (17) tend toward the ideal coefficients derived from equation (15). It follows from equation (17) that the output of the interpolation filter Y(x) can be represented as:

$$Y(x) = \sum_{n=1}^{N} U(x-n) \sum_{i=1}^{L} G_i(n) \cdot f(i,\tau) \qquad (18)$$

where U(x) are the channel sample values 32 and N is the number of interpolation filter coefficients $c_\tau(n)$.

Referring again to FIG. 6, the coefficient register file can compute the interpolation filter coefficients $c_\tau(n)$ according to equation (17) and then convolve the coefficients $c_\tau(n)$ with the channel samples U(x) 32 to generate the interpolated sample values B102 synchronized to the baud rate. However, a more efficient implementation of the interpolation filter can be achieved by rearranging equation (18):

$$Y(x) = \sum_{i=1}^{L} f(i,\tau) \sum_{n=1}^{N} G_i(n) \cdot U(x-n) \quad (19)$$

FIG. 7 shows the preferred embodiment of the interpolation filter according to equation (19). In the polynomial embodiment, the function of $\tau$ is a polynomial in $\tau$, and the matrix $G_i(n)$ are the coefficients of the polynomial. And in the reduced rank matrix embodiment, the function of $\tau$ is to index the above $F_{M \times L}$ matrix B262, and the second summation in equation (19), $$\sum_{n=1}^{N} G_i(n) \cdot U(x-n)$$

is implemented as a bank of FIR filters B260 as shown in FIG. 7. Again, in equation (19) L is the depth of the approximation function $f(i,\tau)$ (e.g., the order of the polynomial or the column size of the above $F_{M \times L}$ matrix) and N is the depth of the interpolation filter's impulse response (i.e., the number of coefficients in the impulse response). It has been determined that N=8 and L=3 provides the best performance/cost balance; however, these values may be increased as IC technology progresses and the cost per gate decreases.

The embodiment of FIG. 3 assumes that the magnetic disk storage systems implements an "ID-Less" format. If an "ID" format is used, then a separate frequency synthesizer for read and write would be preferred since it is not practical to change the synthesizer's frequency to accommodate a write immediately after reading the ID. Further, although the interpolated timing recovery of the present invention has been disclosed in relation to a d=0 PR4 read channel, the principles disclosed herein are equally applicable to other types of sampled amplitude read channels such as d=1 EPR4 or EEPR4 read channels. In a d=1 read channel, the slicer B141 of FIG. 4A is replaced by a pulse detector as described in the above reference U.S. Pat. No. 5,359,631.

The objects of the invention have been fully realized through the embodiments disclosed herein. Those skilled in the art will appreciate that the aspects of the invention can be achieved through various other embodiments without departing from the essential function. The particular embodiments disclosed are illustrative and not meant to limit the scope of the invention as appropriately construed by the following claims.

TABLE 1

| Channel | Transfer Function | Dipulse Response |
|---|---|---|
| PR4 | (1 − D) (1 + D) | 0, 1, 0, −1, 0, 0, 0, . . . |
| EPR4 | (1 − D) (1 + D)² | 0, 1, 1, −1, −1, 0, 0, . . . |
| EEPR 4 | (1 − D) (1 + D)³ | 0, 1, 2, 0, −2, −1, 0, . . . |

TABLE B2

| τ · 32/Ts | C (−2) | C (−2) | C (0) | C (1) | C (2) | C (3) |
|---|---|---|---|---|---|---|
| 0 | 0.0000 | −0.0000 | 1.0000 | 0.0000 | −0.0000 | 0.0000 |
| 1 | 0.0090 | −0.0231 | 0.9965 | 0.0337 | −0.0120 | 0.0068 |
| 2 | 0.0176 | −0.0445 | 0.9901 | 0.0690 | −0.0241 | 0.0135 |
| 3 | 0.0258 | −0.0641 | 0.9808 | 0.1058 | −0.0364 | 0.0202 |
| 4 | 0.0335 | −0.0819 | 0.9686 | 0.1438 | −0.0487 | 0.0268 |
| 5 | 0.0407 | −0.0979 | 0.9536 | 0.1829 | −0.0608 | 0.0331 |
| 6 | 0.0473 | −0.1120 | 0.9359 | 0.2230 | −0.0728 | 0.0393 |
| 7 | 0.0533 | −0.1243 | 0.9155 | 0.2638 | −0.0844 | 0.0451 |
| 8 | 0.0587 | −0.1348 | 0.8926 | 0.3052 | −0.0957 | 0.0506 |

TABLE B2-continued

| τ · 32/Ts | C (−2) | C (−2) | C (0) | C (1) | C (2) | C (3) |
|---|---|---|---|---|---|---|
| 9 | 0.0634 | −0.1434 | 0.8674 | 0.3471 | −0.1063 | 0.0556 |
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0.6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0.1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

We claim:

1. A time varying FIR filter for generating output sample values Y(x) from a sequence of input sample values U(x), comprising:

(a) a means for receiving and storing the sequence of input sample values U(x);

(b) a means for receiving an input variable having a value selected from a predetermined M number of values; and (c) a means for storing a first matrix of predetermine values $F_{M \times L}$ indexed by the input variable, where L is a predetermined approximation degree, wherein:

(a) the time varying FIR filter has an impulse response h(n) comprised of a N number of actual coefficients computed using the first matrix of predetermined values $F_{M \times L}$ and a second matrix of predetermined values $G_{L \times N}$;

(b) L determines a degree that the actual coefficients approximate ideal coefficients;

(c) the ideal coefficients are represented by a matrix $A_{M \times N}$;

(d) the matrices $F_{M \times L}$ and $G_{L \times N}$ are factors of a rank reduced approximation of the matrix $A_{M \times N}$; and (e) the output sample values Y(x) are generated as a function of the input sample values U(x) and the $F_{M \times L}$ and $G_{L \times N}$ matrices.

2. The time varying FIR filter as recited in claim 1, further comprising a means for generating the output sample values Y(x) according to:

$$Y(x) = \sum_{n=1}^{N} U(x-n) \sum_{i=1}^{L} G_i(n) \cdot f(i,\tau);$$

τ is the time varying input variable;

$G_i(n)$ is the $G_{L \times N}$ matrix; and $f(i,\tau)$ is the $F_{M \times L}$ matrix.

3. The time varying FIR filter as recited in claim 1, further comprising a means for generating the output sample values Y(x) according to:

$$Y(x) = \sum_{i=1}^{L} f(i,\tau) \sum_{n=1}^{N} G_i(n) \cdot U(x-n);$$

$\tau$ is the time varying input variable;
$G_i(n)$ is the $G_{L \times N}$ matrix; and
$f(i,\tau)$ is the $F_{M \times L}$ matrix.

4. The time varying FIR filter as recited in claim 3, wherein $$\sum_{n=1}^{N} G_i(n) \cdot U(x-n)$$

is implemented as a bank of discrete time FIR filters.

5. The time varying FIR filter as recited in claim 1, wherein:
 (a) the time varying FIR filter is a discrete time interpolation filter for generating interpolated sample values $Y(x)$;
 (b) the input variable is an interpolation interval $\tau$; and
 (c) each value of $\tau$ corresponds to a phase difference between an input sample value $U(x)$ and an interpolated sample value $Y(x)$.

6. A method for performing a sample rate conversion between a sequence of input sample values $U(x)$ and a sequence of output sample values $Y(x)$ using a time varying FIR filter, comprising the steps of:
 (a) receiving and storing the input sample values $U(x)$;
 (b) receiving a time varying input variable having a value selected from a predetermined M number of values;
 (c) representing ideal FIR filter coefficients by a M×N matrix $A_{M \times N}$, where N is a predetermined number of coefficients in an impulse response of an ideal FIR filter;
 (d) factoring the $A_{M \times N}$ matrix into an $F_{M \times N}$ and $G_{N \times N}$ matrices;
 (e) computing a reduced $F_{M \times L}$ and $G_{L \times N}$ matrices such that:

$$F_{M \times L} \cdot G_{L \times N} = A_{M \times N}; \text{ and}$$

(f) computing the output sample values $Y(x)$ as a function of the input sample values $U(x)$ and the $F_{M \times L}$ and $G_{L \times N}$ matrices.

7. The method for performing a sample rate conversion as recited in claim 6, wherein the step of computing the reduced $F_{M \times L}$ and $G_{L \times N}$ matrices comprises the steps of:
 (a) performing a singular value decomposition (SVD) of the $A_{M \times N}$ matrix such that $A_{M \times N} = U_{M \times N} \cdot D_{N \times N} \cdot V_{N \times N}$, where $U_{M \times N}$ is a M×N unitary matrix, D is a N×N diagonal matrix $\{\sigma_1, \sigma_2, \ldots, \sigma_N\}$ where $\sigma_i$ are the singular values of $A_{M \times N}$, and $V_{N \times N}$ is a N×N unitary matrix;
 (b) selecting a predetermined L number of the largest singular values $\sigma$ to generate a reduced size diagonal matrix $D_{L \times L}$;
 (c) extracting the first L columns from the $U_{M \times N}$ matrix to form a reduced $U_{M \times L}$ matrix;
 (d) extracting the first L rows from the $V_{N \times N}$ matrix to form a reduced $V_{L \times N}$ matrix;
 (e) defining a reduced $F_{M \times L}$ and $G_{L \times N}$ matrices such that:

$$F_{M \times L} \cdot G_{L \times N} = U_{M \times L} \cdot D_{L \times L} \cdot V_{L \times N} = A_{M \times N}.$$

8. The method for performing a sample rate conversion as recited in claim 6, further comprising the step of generating the output sample values $Y(x)$ according to:

$$Y(x) = \sum_{n=1}^{N} U(x-n) \sum_{i=1}^{L} G_i(n) \cdot f(i,\tau);$$

$\tau$ is the time varying input variable;
$G_i(n)$ is the $G_{L \times N}$ matrix; and
$f(i,\tau)$ is the $F_{M \times L}$ matrix.

9. The method for performing a sample rate conversion as recited in claim 6, further comprising the step of generating the output sample values $Y(x)$ according to:

$$Y(x) = \sum_{i=1}^{L} f(i,\tau) \sum_{n=1}^{N} G_i(n) \cdot U(x-n);$$

$\tau$ is the time varying input variable;
$G_i(n)$ is the $G_{L \times N}$ matrix; and
$f(i,\tau)$ is the $F_{M \times L}$ matrix.

10. The method for performing a sample rate conversion as recited in claim 9, wherein $$\sum_{n=1}^{N} G_i(n) \cdot U(x-n)$$

is implemented as a bank of discrete time FIR filters.

11. The method for performing a sample rate conversion as recited in claim 6, wherein:
 (a) the time varying FIR filter is a discrete time interpolation filter for generating interpolated sample values $Y(x)$;
 (b) the input variable is an interpolation interval $\tau$; and
 (c) each value of $\tau$ corresponds to a phase difference between an input sample value $U(x)$ and an interpolated sample value $Y(x)$.

* * * * *